United States Patent
Thiesfeld (10) Patent No.: US 6,886,051 B2
(45) Date of Patent: Apr. 26, 2005

(54) DEVICE DISCOVERY METHOD AND APPARATUS

(75) Inventor: Charles William Thiesfeld, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 11 days.

(21) Appl. No.: 10/246,849

(22) Filed: Sep. 18, 2002

(65) Prior Publication Data

US 2003/0184902 A1 Oct. 2, 2003

Related U.S. Application Data

(60) Provisional application No. 60/368,203, filed on Mar. 28, 2002.

(51) Int. Cl.$^7$ .............................................. G06F 13/00
(52) U.S. Cl. .......................... 710/9; 710/104; 710/306
(58) Field of Search .............................. 710/8–12, 104, 710/105, 300, 305–316, 9, 306

(56) References Cited

U.S. PATENT DOCUMENTS

| | | | |
|---|---|---|---|
| 4,621,342 A | 11/1986 | Capizzi et al. ............... 362/900 |
| 5,175,822 A | * 12/1992 | Dixon et al. .................... 710/9 |
| 5,274,774 A | 12/1993 | Manber et al. ............. 395/325 |
| 5,414,694 A | 5/1995 | Crayford et al. ........... 370/13.1 |
| 5,420,987 A | * 5/1995 | Reid et al. .................... 710/10 |
| 5,430,848 A | 7/1995 | Waggener .................... 395/325 |
| 5,511,227 A | * 4/1996 | Jones ............................. 710/9 |
| 5,630,173 A | 5/1997 | Oprescu ...................... 395/860 |
| 5,644,731 A | 7/1997 | Liencres et al. ............. 395/283 |
| 5,664,221 A | * 9/1997 | Amberg et al. ................. 710/9 |
| 5,764,895 A | 6/1998 | Chung ...................... 395/700.8 |
| 5,835,720 A | 11/1998 | Nelson et al. .......... 395/200.54 |
| 5,862,404 A | 1/1999 | Onaga ......................... 395/828 |
| 5,905,877 A | 5/1999 | Guthrie et al. .............. 395/292 |
| 5,909,591 A | * 6/1999 | Brooke .......................... 710/9 |
| 5,936,960 A | 8/1999 | Stewart ....................... 370/438 |
| 6,012,117 A | 1/2000 | Traw et al. ................. 710/123 |
| 6,052,784 A | 4/2000 | Day ............................ 713/201 |
| 6,092,137 A | 7/2000 | Huang et al. ............... 710/111 |
| 6,269,099 B1 | 7/2001 | Borella et al. .............. 370/389 |
| 6,389,495 B1 | * 5/2002 | Larky et al. ................... 710/8 |
| 6,415,314 B1 | * 7/2002 | Fee et al. .................... 709/201 |
| 6,418,492 B1 | * 7/2002 | Papa et al. .................. 710/302 |
| 6,751,693 B1 | * 6/2004 | Monia et al. ................ 710/104 |
| 6,754,720 B1 | * 6/2004 | Packer ........................... 710/3 |
| 6,804,739 B1 | * 10/2004 | Young et al. ................ 710/300 |

OTHER PUBLICATIONS

Serial Attached SCSI Working Group, "Serial Attached SCSI", Technology Presentation, Dec. 2001.
H. Mason, "The Future of SCSI . . . ", datatech, Edition 1, pp. 59–64, date unknown.

* cited by examiner

Primary Examiner—Christopher B. Shin
(74) Attorney, Agent, or Firm—Westman, Champlin & Kelly, P.A.; Todd R. Fronek (57) ABSTRACT

A method of discovering and assigning unique addresses to devices connected by at least one expander in a system is provided. The method includes locating each expander in the system. Also, devices connected to each of the located expanders in the system are scanned. Additionally, the method includes reporting a status of each device connected to the located expanders.

13 Claims, 6 Drawing Sheets

DEVICE DISCOVERY METHOD AND APPARATUS

CROSS-REFERENCE TO RELATED APPLICATION

This application claims priority from U.S. Provisional Application No. 60/368,203 filed on Mar. 28, 2002 for inventor Charles W. Thiesfeld and entitled PORT DISCOVERY METHOD FOR SERIAL ATTACHED SCSI USING PRIMITIVE PROTOCOL.

FIELD OF THE INVENTION

The present invention relates generally to data storage and processing systems, and more particularly but not by limitation to discovery of devices used in said data storage and processing systems.

BACKGROUND OF THE INVENTION

Disc drives communicate with host computers using various standardized interfaces. In some interfaces, devices in a system share a common pathway for delivering messages throughout the system. Since the devices share a common pathway, each device must have a unique address in order for messages to be sent to the proper device. When a system is powered on or a device is plugged into or removed from a system configuration during operation, a process is needed to make other devices in the system aware of the current system configuration. Embodiments of the present invention address these and other problems, and offer other advantages over the prior art.

SUMMARY OF THE INVENTION

A method of discovering and assigning unique addresses to devices connected by at least one expander in a system is provided. The method includes locating each expander in the system. Also, devices connected to each of the located expanders in the system are scanned. Additionally, the method includes reporting a status of each device connected to the located expanders.

Another aspect of the present invention is an apparatus for use in discovering devices in a system. The apparatus includes a plurality of ports for connecting to a plurality of devices in the system. The apparatus also includes a controller coupled to the plurality of ports and adapted to receive a discovery primitive containing an expander address. The controller is also adapted to transmit a status primitive indicating a match with the expander address contained in the discovery primitive and receive a discovery primitive containing an expander address and a device address associated with the expander address. Furthermore, the controller reports a status of a device associated with the expander address and the device address.

Other features and benefits that characterize embodiments of the present invention will be apparent upon reading the following detailed description and review of the associated drawings.

DETAILED DESCRIPTION OF ILLUSTRATIVE EMBODIMENTS

Embodiments of the present invention are useful in various data storage and processing systems. One particular embodiment is a mid-range storage server utilizing multiple disc drives and operating under a Small Computer System Interface (SCSI) protocol. Illustratively, the system uses the Serial Attached SCSI (SAS) interface wherein various devices are connected via high speed serial links. The system may include various devices such as hosts and disc drives. Hosts process data while disc drives provide data storage. The disc drives may use differing protocols such as SAS or Serial ATA.

Expanders allow hosts and disc drives to connect to one or more devices. Hosts and drives connect to the system through expanders and can be arranged in what is known as a "star" topology. Additionally, expanders may connect to other expanders. As a result, the connections in a system include host-expander, expander-expander and expander-disc drive.

In a SAS environment, each device must have a unique address. The unique address generally includes two components. The first component pertains to an expander address and the second component pertains to a device address. In one embodiment, an expander has an address assigned by a memory component on the expander, for example PROM, switches, flash or other component. The device address usually corresponds to a particular port located on the expander and may be a physical address referenced by the expander. Utilizing the present invention allows unique addresses to be assigned during a discovery process and allows devices in the system to be aware of the availability of other devices in the system.

For illustrative purposes, reference herein is made to messages known as "primitives". However, those skilled in the art will realize that other types of messages can also be used and the invention is not limited as such. Primitives are packets of data transmitted throughout a system according to a particular protocol. Typically, primitives include 32-bits of data separated into 4 bytes (1 byte equals 8 bits of data) although various lengths of messages may be used and separated differently.

The first byte establishes that a primitive is being sent. The second byte identifies the particular type of primitive. Various types of primitives are described below and include a change primitive, discovery primitive, status primitive and others. The third and fourth bytes are associated with address parameters. In one embodiment, the third byte is an expander address and the fourth byte is a device address corresponding to an expander port. Accordingly, a particular device is referenced by the address of the expander and the port of the expander to which it connects. Illustratively, a zero address in either or both of the third and fourth bytes is reserved for certain situations as described later.

Figure 1:
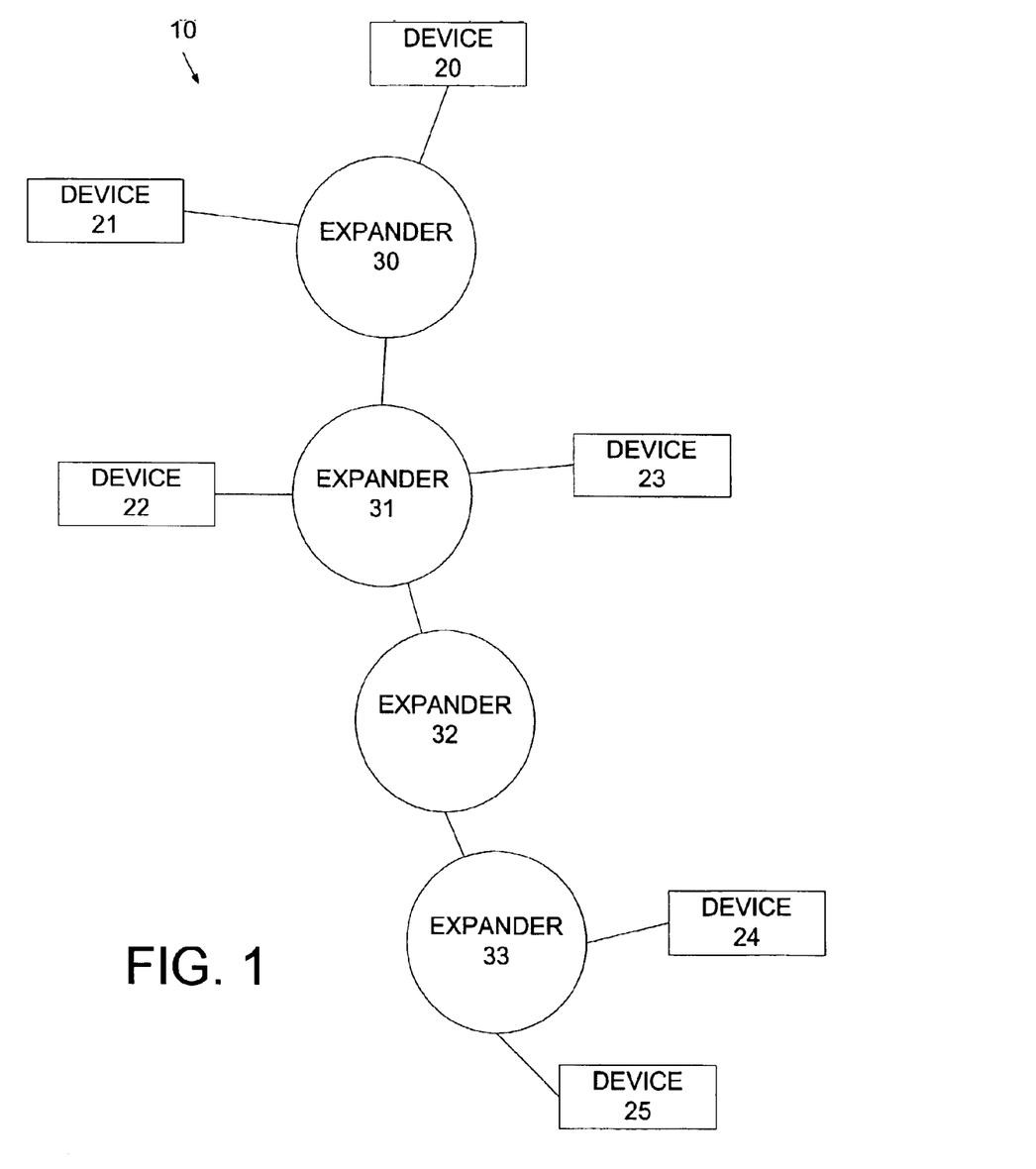
FIG. 1 is a block diagram of a storage and data processing system.

FIG. 1 illustrates a system 10 for which embodiments of the present invention are useful. Illustratively, system 10 includes devices 20–25 and expanders 30–33. Devices 20–25 may be any computing device including a host device (such as a computer), disc drive or other device. Expanders 30–33 allow communication between one or several devices and other expanders. Illustratively, expanders 30–33 include ports having a bi-directional data path and allow one or more devices to be simultaneously connected to its respective ports. When a system or device is initialized (i.e. at power on or when a device is plugged into a configuration) a discovery process initiates in order for devices 20–25 to utilize the resources of other devices in system 10.

Figure 2:
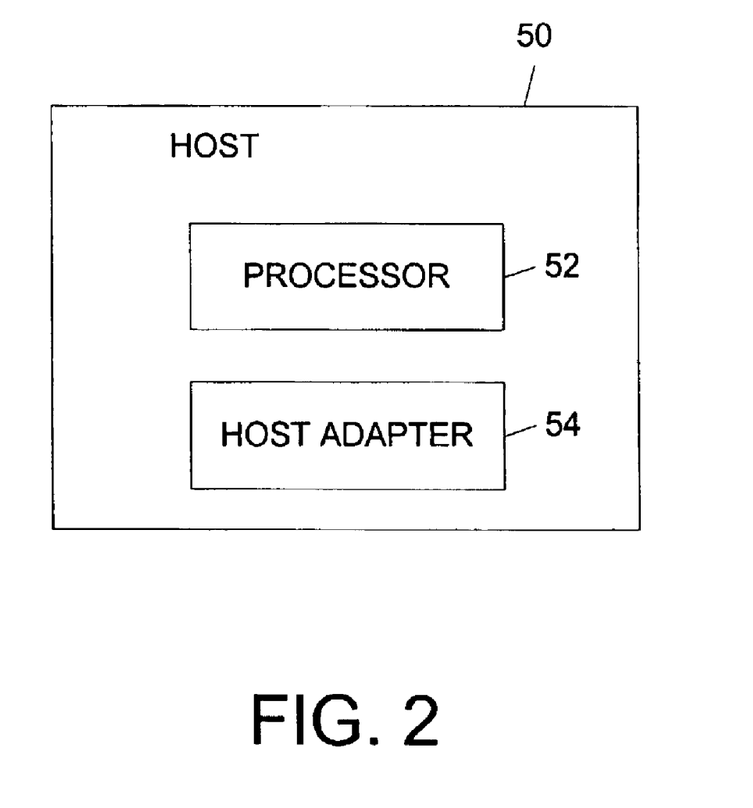
FIG. 2 is a block diagram of a host.

FIG. 2 is a block diagram of a host 50 for use in system 10 as previously described. Host 50 includes at least one processor 52 and a host adapter 54. Processor 52 is used to process data. Host adapter 54 allows host 50 to communicate with other devices in the system. Host adapter 54 typically connects to an expander in the system in order for processor 52 to be able to utilize disc drive resources in the system. For example, processor 52 may wish to access data stored on a disc drive in the system.

Figure 3:
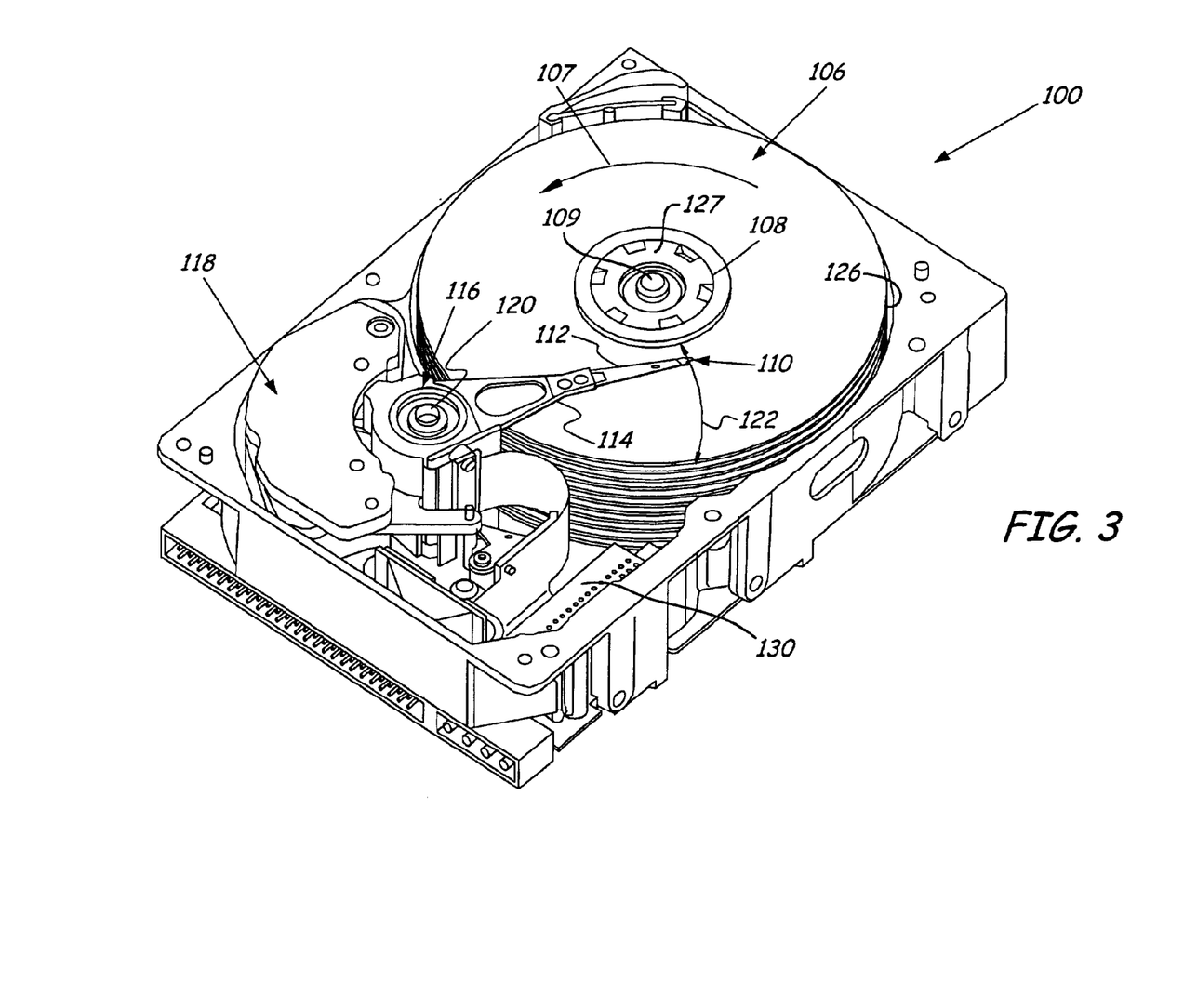
FIG. 3 is an isometric view of a disc drive.

FIG. 3 is an isometric view of one example of a disc drive 100 for use in system 10 as previously described. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 3, sliders 110 are supported by suspensions 112 which are in turn attached to track accessing arms 114 of an actuator 116. The actuator shown in FIG. 3 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 4:
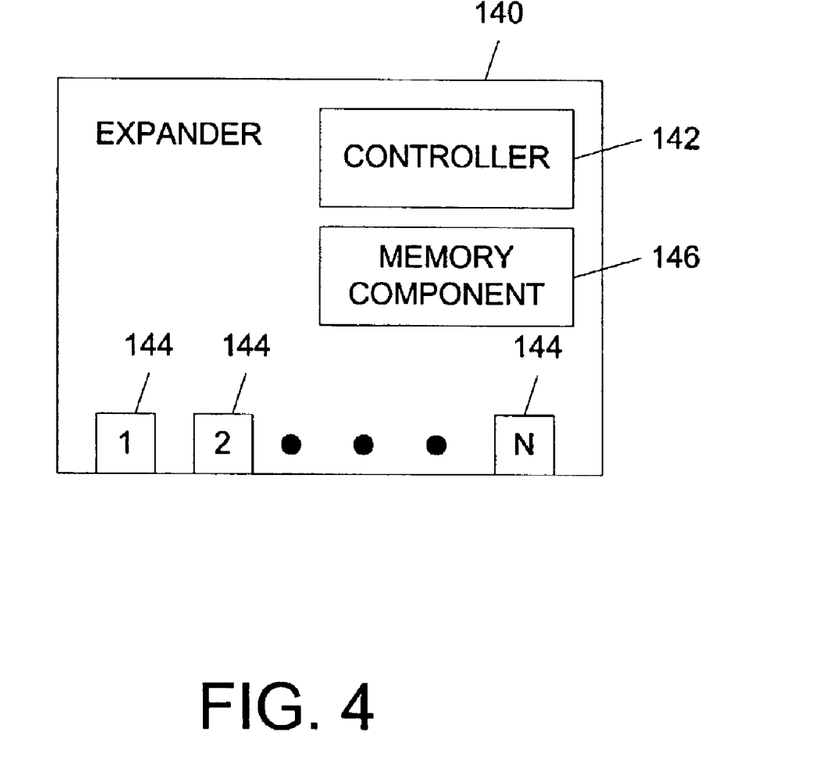
FIG. 4 is a block diagram of an expander.

FIG. 4 is a block diagram of an expander 140 for use in system 10 as previously described. Expander 140 includes controller 142 and a plurality of ports 144. Controller 142 controls data passing through expander 140 via the plurality of ports 144 and assists in assigning unique addresses in system 10. Ports 144 have devices connected and provide communication to a plurality of devices. If desired, expander 140 may include a memory component 146 for assigning its respective address in the system. As noted earlier, this may be a physical addressing component such as a collection of switches or PROM. Illustratively, expanders include converters, bus extenders, repeaters and switches.

Figure 5:
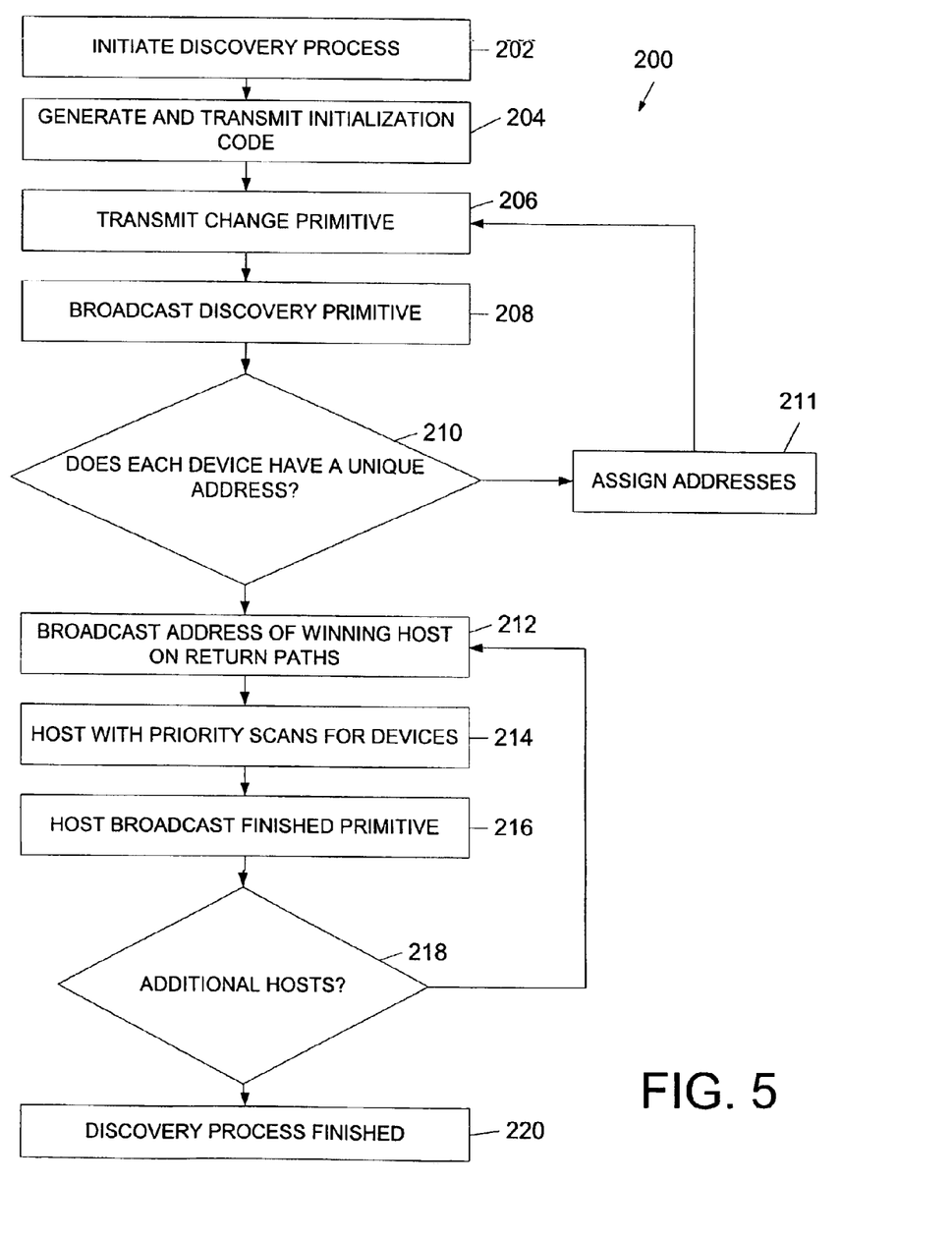
FIG. 5 is a flow chart of a method for discovering devices in a system.

Utilizing method 200 illustrated in FIG. 5, devices 20–25 of system 10 are discovered and unique addresses are assigned to each device. A discovery process is initiated at step 202. For example, the process is typically initiated after power on or after a new device is plugged into one of the expanders 30–33. At step 204, an initialization code is generated. This initialization code communicates that a particular device is ready. For example, this code may be a standard specification code set by a particular standard interface used when a device is plugged into a system. One particular code is known as Out of Band (OOB) and is described in the SATA 1.0 Standard Specification.

Once one of the expanders 30–33 receives the initialization code, a change primitive is sent to each of the other expanders 20–25 in system 10 at step 206. The address bytes of the change primitive contain the expander address of the expander that initiated the change primitive and the device address (which corresponds to the particular port to which the device connects) of the device. The change primitive alerts each of the devices in the system that a configuration change has occurred. At step 208, each of the devices 20–25 that are hosts broadcast a discovery primitive with their respective addresses included in the address parameter bytes of the primitives.

At step 210, the expanders 30–33 assure there is a unique address for all of the expanders 30–33, including itself. Unique address determination can be made by checking the address in each of the discovery primitives. It should be noted that expanders without devices attached in some instances only serve to forward data. Thus, these expanders (for example expander 32 in FIG. 1) do not need to have a unique address assigned. If all the addresses are not unique, addresses are reassigned to guarantee address uniqueness at step 211. If this unobtainable, there is a local loop created within the system. In this case manual intervention may be necessary to prevent looping. For example, this intervention would assure that there is only a single path between expander 31 and 33. Additionally, a message may be sent to all devices indicative of a bad configuration. Assigning unique addresses may be accomplished using a central program or for example by an administrator adjusting switches or other component within each of the expanders. After the addresses are assigned, the method returns to step 206 and a change primitive is again sent.

Once the expanders 30–33 assure that there are unique addresses for each of the devices, the method proceeds to step 212. Here, the expanders 30–33 illustratively broadcast the highest priority address (i.e., the highest address) of the discovery primitives received on each of the return paths. The address that is broadcast is arbitrarily chosen using various methods. In this manner, each of the expanders 30–33 act as arbitrators to determine which host "wins", and thus may scan for devices first. Each of the remaining hosts that do not win arbitration wait until the host that won arbitration has scanned for devices.

In step 214, the host with priority scans for devices. The scan begins by sending a discovery primitive to successive expander addresses. The expander owning the address will return a status primitive. The scanning process is described in more detail below with reference to FIG. 6. Once the host scans for devices, the host broadcasts a finished message at step 216. Illustratively, this message is the discovery primitive with expander address zero. Next, system 10 determines whether there are additional hosts needed to scan for devices at step 218. If additional hosts need to scan for devices, the method returns to step 208. Once all hosts have participated in the discovery process, the discovery process is finished at step 220. Each of the devices in system 10 may be aware of the end of the discovery process by broadcasting a discovery primitive with the expander address zero and device address zero.

Figure 6:
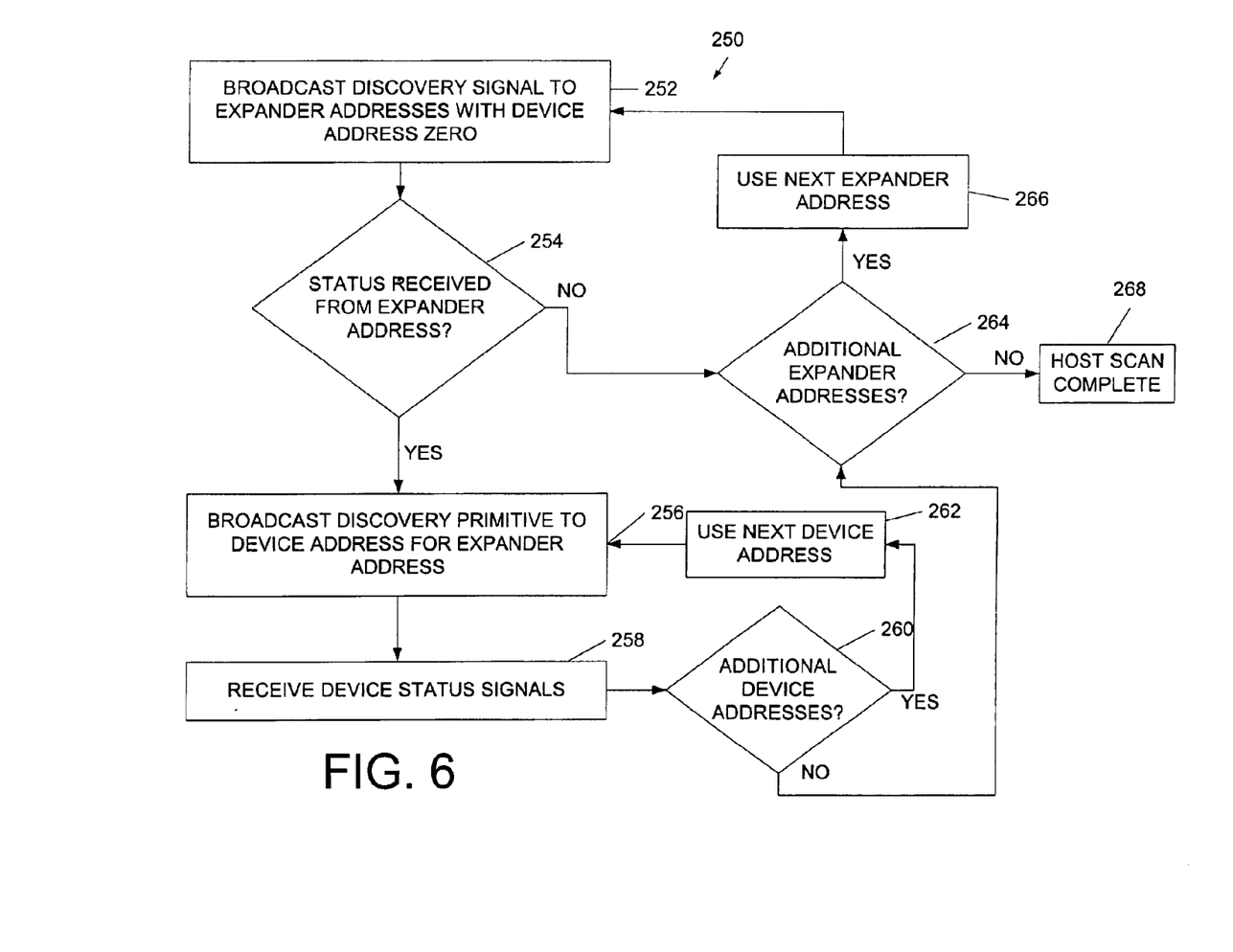
FIG. 6 is a flow chart of a method of scanning for devices in a system.

FIG. 6 illustrates method 250, which is used by a host to scan for devices. At step 252, the host broadcasts a discovery primitive to an expander address with device address zero in order to locate the expanders in the system. The discovery primitive is sent to each of the expanders in the system. Each of the expanders wait until each expander port has returned a status message. The status message will be 'not I' if the expander address does not match and will be a status primitive if the address does match.

Once each of the expander ports for a particular expander have reported, the particular expander returns a status message indicative of the status received from each of its ports. If one of the ports returns a status primitive, the expander will return the status primitive. If all of the expander ports return 'not I' status, the expander will return a 'not I' status message.

At step 254, the host receives a status message from the system. If a status primitive is received by the host, the host broadcasts a discovery primitive to a device address with the particular expander address that has returned a status primitive at step 256. The expander having the particular expander address returns the status of the device address that has been sent at step 258. The status may return a variety of information including particular attributes of the device, the type of device and the address of the attached device. Sending the discovery primitive is repeated with successive device addresses for each of the devices for the particular expander address as illustrated in steps 260 and 262.

If there are not additional device addresses, the method determines if there are additional expander addresses at step 264. If there are additional expander addresses, the method uses the next expander address at step 266 and then returns to step 252. Once all expander addresses have been scanned and each device has reported to the host, the host scan is complete at step 268.

In summary, a method of discovering and assigning unique addresses to devices (20–25, 50, 100) connected by at least one expander (30–33, 140) in a system (10) is provided. The method includes locating each expander (30–33, 140) in the system (10). Also, devices (20–25, 50, 100) connected to each of the located expanders (30–33, 140) in the system (10) are scanned. Additionally, the method includes reporting a status of each device (20–25, 50, 100) connected to the located expanders (30–33, 140).

Another aspect of the present invention is an apparatus for use in discovering devices in a system (10). The apparatus includes a plurality of ports (144) for connecting to a plurality of devices (20–25, 50, 100) in the system (10). The apparatus also includes a controller (142) coupled to the plurality of ports (144) and adapted to receive a discovery primitive containing an expander address. The controller (142) is also adapted to transmit a status primitive indicating a match with the expander address contained in the discovery primitive and receive a discovery primitive containing an expander address and a device address associated with the expander address. Furthermore, the controller (142) reports a status of a device associated with the expander address and the device address.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage and processing system while maintaining substantially the same functionality without departing from the scope and spirit of the present invention. In addition, although the preferred embodiment described herein is directed to a data storage and processing system for discovery of attached devices, it will be appreciated by those skilled in the art that the teachings of the present invention can be applied to other systems, without departing from the scope and spirit of the present invention.

What is claimed is:

1. A method of discovering and assigning unique addresses to devices connected by a plurality of expanders in a system comprising the steps of:
   (a) for each expander in the system;
      (ii) broadcasting a discovery message containing an expander address; and
      (ii) returning a status message from an expander identified by the expander address;
   (b) for devices connected to each of the expanders in the system;
      (i) broadcasting a discovery message containing the expander address and a device address; and
      (ii) locating a device identified by the expander address and the device address; and
   (c) reporting a status of each device connected to the expanders.

2. The method of claim 1 and further comprising the step of:
   (d) generating a code to identify a device that is a new connection in the system.

3. The method of claim 2 and further comprising the step of:
   (e) broadcasting a change message containing an expander address and a device address of the device that is the new connection to each of the devices in the system after the new connection is identified.

4. The method of claim 1 and further comprising the step of:
   (d) determining which device will scan the system for other devices.

5. The method of claim 1 and further comprising the step of:
   (d) checking whether each expander has a unique address.

6. The method of claim 5 and further comprising the step of:
   (e) assigning addresses to the expanders if each expander does not have a unique address.

7. The method of claim 1 wherein the system includes a plurality of hosts and each host repeats steps (a)–(c).

8. An apparatus for use in discovering devices in a system, comprising:
   a plurality of ports for connecting to a plurality of devices in the system; and
   a controller coupled to the plurality of ports and adapted to receive a discovery message containing an expander address, transmit a status message indicating a match with the expander address contained in the discovery message, receive a discovery message containing an expander address and a device address associated with the expander address, report a status of a device associated with the expander address and the device address and check whether each expander in the system has a unique address.

9. The apparatus of claim 8 wherein the controller is further adapted to receive a code generated by a device connected to one of the plurality of ports and transmit a change message based on the code received.

10. The apparatus of claim 8 wherein the controller is further adapted to determine which device in the system will scan for devices.

11. The apparatus of claim 8 wherein the controller is further adapted to assure unique addresses for a plurality of expanders in the system.

12. The apparatus of claim 8 wherein the controller is further adapted to assign unique addresses for each device connected to the plurality of ports.

13. The apparatus of claim 8 and further comprising a memory component coupled to the controller and including an expander address.

* * * * *

UNITED STATES PATENT AND TRADEMARK OFFICE
CERTIFICATE OF CORRECTION

PATENT NO. : 6,886,051 B2  Page 1 of 1
APPLICATION NO. : 10/246849
DATED : April 26, 2005
INVENTOR(S) : Charles William Thiesfeld It is certified that error appears in the above-identified patent and that said Letters Patent is hereby corrected as shown below:

Col. 6, Line 1, replace "(ii)" with -- (i) --.

Signed and Sealed this

Twenty-seventh Day of November, 2007

JON W. DUDAS
*Director of the United States Patent and Trademark Office*